US012741424B2

(12) United States Patent
Waisel et al.

(10) Patent No.: US 12,741,424 B2
(45) Date of Patent: Sep. 22, 2026

(54) SYSTEM AND METHOD FOR PRINTING A LABELED THREE-DIMENSIONAL OBJECT

(71) Applicant: STRATASYS LTD., Rehovot (IL)

(72) Inventors: Shai Waisel, Petach Tikva (IL); Shahar Klinger, Rehovot (IL); David Tal, Rehovot (IL); Shai Lipowitch, Petach Tikva (IL)

(73) Assignee: STRATASYS LTD., Rehovot (IL)

( * ) Notice: Subject to any disclaimer, the term of this patent is extended or adjusted under 35 U.S.C. 154(b) by 274 days.

(21) Appl. No.: 18/724,960

(22) PCT Filed: Dec. 20, 2022

(86) PCT No.: PCT/IL2022/051352
§ 371 (c)(1),
(2) Date: Jun. 27, 2024

(87) PCT Pub. No.: WO2023/126915
PCT Pub. Date: Jul. 6, 2023

(65) Prior Publication Data

US 2025/0170781 A1 May 29, 2025

Related U.S. Application Data

(60) Provisional application No. 63/295,522, filed on Dec. 31, 2021.

(51) Int. Cl.
*B29C 64/393* (2017.01)
*G06T 17/20* (2006.01)
*B33Y 50/02* (2015.01)

(52) U.S. Cl.
CPC ............ *B29C 64/393* (2017.08); *G06T 17/20* (2013.01); *B33Y 50/02* (2014.12)

(58) Field of Classification Search
CPC ..... B29C 64/393; B29C 64/386; G06T 17/20; B33Y 50/02; B33Y 50/00
See application file for complete search history.

(56) References Cited

U.S. PATENT DOCUMENTS

2019/0325111 A1* 10/2019 Vernon .................. B33Y 50/00
2020/0142384 A1* 5/2020 Bressler ................. B33Y 50/00
(Continued)

FOREIGN PATENT DOCUMENTS

WO WO 2020/208254 10/2020

OTHER PUBLICATIONS

Anonymous; Meshmixer Tutorial: 15 Top Tips to Edit STL Files for 3D Printing; Feb. 24, 2021.
(Continued)

*Primary Examiner* — Mong-Shune Chung
(74) *Attorney, Agent, or Firm* — PEARL COHEN LLP

(57) ABSTRACT

Systems and methods for 3D printing a labeled object, including: receiving a 3D container mesh, receiving a 3D label mesh, wherein the 3D label mesh is an open mesh, ensuring correct positioning of the label mesh in relation to the container mesh, projecting the contour of the label mesh onto the container mesh to obtain a container mesh overlapping area, applying a local tessellation to the container mesh overlapping area according to the label contour, thereby generating a tessellated container mesh and/or applying a local tessellation to the label mesh according to the container mesh overlapping area, thereby generating a tessellated label mesh, replacing the tessellated container mesh overlapping area with the tessellated label mesh, thereby obtaining a labeled container mesh, and printing the labeled 3D object based on the labeled container mesh.

20 Claims, 7 Drawing Sheets

(56) References Cited

U.S. PATENT DOCUMENTS

| | | | | |
|---|---|---|---|---|
| 2023/0074094 | A1* | 3/2023 | Hertzmann | G06T 17/20 |
| 2024/0168460 | A1* | 5/2024 | Marinov | B33Y 50/00 |

OTHER PUBLICATIONS

Mei Gang et al; Simple and Robust Boolean Operations for Triangulated Surfaces; aiXiv:1308.4433v2 20 (Aug. 2013).

Chen Ming et al; Efficient Boolean Operation on Manifold Mesh Surfaces; Computer-Aided Design and Applications; vol. 7, No. 3; Jan. 1, 2010.

Soren Bendlin Gammelmark; A brief overview of transparency in KeyShot; Luxion Aps; Dec. 22, 2020.

* cited by examiner

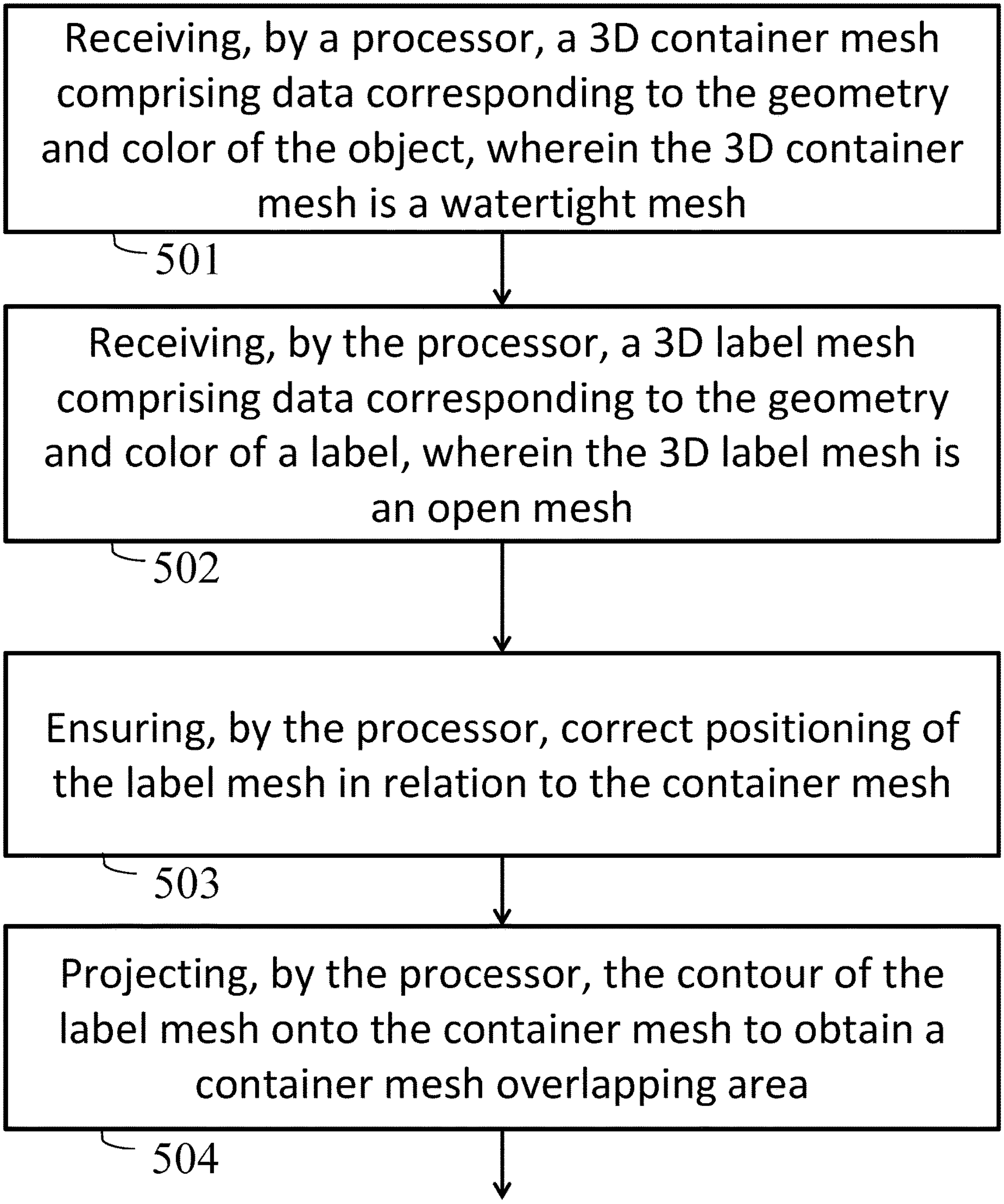

FIG. 5A

Receiving, by a processor, a 3D container mesh comprising data corresponding to the geometry and color of the object, wherein the 3D container mesh is a watertight mesh

501

Receiving, by the processor, a 3D label mesh comprising data corresponding to the geometry and color of a label, wherein the 3D label mesh is an open mesh

502

Ensuring, by the processor, correct positioning of the label mesh in relation to the container mesh

503

Projecting, by the processor, the contour of the label mesh onto the container mesh to obtain a container mesh overlapping area

504

SYSTEM AND METHOD FOR PRINTING A LABELED THREE-DIMENSIONAL OBJECT

CROSS-REFERENCE TO RELATED APPLICATIONS

This application is a National Phase Application of PCT International Application No. PCT/IL2022/051352, International Filing Date Dec. 20, 2022, claiming the benefit of U.S. Provisional Patent Application No. 63/295,522, filed Dec. 31, 2021 which are hereby incorporated by reference.

FIELD OF THE INVENTION

The present invention relates to printing three-dimensional (3D) objects. More particularly, the present invention relates to systems and methods for printing labeled 3D objects.

BACKGROUND

In recent years, numerous technological advancements have become available in the field of three-dimensional (3D) inkjet printing. For 3D inkjet printing, building materials are selectively jetted from one or more print heads and dispensed onto a fabrication tray to form the 3D object, layer-by-layer, according to a pre-determined configuration as defined by a software file.

Building materials may be modeling materials, which are selectively dispensed to produce the 3D object, and support materials (also referred to as "supporting material"), which are selectively dispensed to form support constructions which sustain specific regions of the 3D object during the printing process.

For instance, a support construction may be necessary when the object includes negative angle surfaces, hollows and/or overhangs, and is typically configured to be removed after the printing is complete.

It is also possible to print a 3D labeled object, where a portion of the 3D model of the 3D object to be printed displays a 3D label. Typically, labels are generated in CAD (Computer Aided Design) software as open surfaces or textured open meshes appended to containers (e.g., cylindrical bodies). However, such mesh assemblies do not fulfill the requirements for 3D printing, as the label mesh is not water-tight and is generally found "floating" around the container (e.g. the two meshes are not connected). Furthermore, 3D objects may present different kind of labels with either a transparent, semi-transparent or an opaque background, and adequate color transition with the container color remains challenging so that the printed 3D object corresponds to the CAD model.

Therefore, there is a need for systems and methods to adequately print labeled 3D objects.

SUMMARY

There is thus provided, in accordance with some embodiments of the invention, a method of 3D printing a labeled object, the method including: receiving a 3D container mesh including data corresponding to the geometry and color of the object, wherein the 3D container mesh is a watertight mesh, receiving a 3D label mesh including data corresponding to the geometry and color of a label, wherein the 3D label mesh is an open mesh, ensuring correct positioning of the label mesh in relation to the container mesh, projecting the contour of the label mesh onto the container mesh to obtain a container mesh overlapping area, applying a local tessellation to the container mesh overlapping area according to the label contour, thereby generating a tessellated container mesh and/or applying a local tessellation to the label mesh according to the container mesh overlapping area, thereby generating a tessellated label mesh, replacing the tessellated container mesh overlapping area with the tessellated label mesh, thereby obtaining a labeled container mesh, and printing the labeled 3D object based on the labeled container mesh.

In some embodiments, the geometric data of the container mesh includes a plurality of vertices and faces, and wherein the color data includes a texture map and/or colors per vertex. In some embodiments, the geometric data of the label mesh includes a plurality of vertices and faces, and wherein the color data includes a texture map and/or colors per vertex.

In some embodiments, ensuring correct positioning of the label mesh in relation to the container mesh includes verifying that a normal distance from each vertex of the label mesh to the surface of the container mesh does not exceed a predetermined threshold.

In some embodiments, projecting the contour of the label mesh on the container mesh includes projecting open edges of the label mesh onto the container mesh. In some embodiments, projecting open edges of the label mesh onto the container mesh is performed by projecting straight lines using a geodesic path.

In some embodiments, applying a local tessellation to the container mesh overlapping area includes adding, moving or deleting vertices and faces of the container mesh so that for each vertex of the label mesh open edges corresponds a projected vertex on the container mesh overlapping area.

In some embodiments, applying a local tessellation to the label mesh includes adding, moving or deleting vertices and faces of the label mesh so that for each vertex of the container mesh overlapping area corresponds a projected vertex on the label mesh.

In some embodiments, replacing the tessellated container mesh overlapping area with the tessellated label mesh includes cutting out the tessellated container mesh overlapping area from the container mesh and inserting the tessellated label mesh at the same location.

In some embodiments, printing the labeled 3D object based on the labeled container mesh includes slicing the labeled container mesh in a plurality of slices, each slice including a plurality of voxels.

In some embodiments, a material allocation to a voxel associated with the label of the labeled container mesh is determined according to (i) a distance of the voxel from the closest surface of the label and (ii) a color data associated with said label closest surface and encoded with a red, green, blue and alpha (RGBa) vector.

In some embodiments, the distance of the voxel from the closest surface of the label is such that the voxel is located in the label color area. In some embodiments, the color data associated with said label closest surface includes an alpha value of 1 and wherein the material allocated to the voxel is selected from cyan, magenta, yellow, black and white (CMYKW) according to an opaque ICC profile.

In some embodiments, the color data associated with said label closest surface includes an alpha value of $0<a<1$ and wherein the material allocated to the voxel is selected from cyan, magenta, yellow, black and white (CMYKW) according to a clear ICC profile. In some embodiments, the color data associated with said label closest surface includes an alpha value of 0 and wherein the material allocated to the voxel is selected from cyan, magenta, yellow, black, white and clear (CMYKWT) according to the container color assignment rule.

In some embodiments, the distance of the voxel from the closest surface of the label is such that the voxel is located in the label core area. In some embodiments, the color data associated with said label closest surface includes an alpha value of 1 and wherein the material allocated to the voxel is white (W).

In some embodiments, the color data associated with said label closest surface includes an alpha value of 0<a<1 and wherein the material allocated to the voxel is selected from cyan, magenta, yellow, black, white and clear (CMYKWT) depending on the alpha value and on the container color assignment rule.

In some embodiments, the chance that white (W) material is allocated to the voxel is directly proportional to the alpha value. In some embodiments, the color data associated with said label closest surface includes an alpha value of 0 and wherein the material allocated to the voxel is selected from cyan, magenta, yellow, black, white and clear (CMYKWT) according to a container color assignment rule.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIGS. 5A-5B show a flowchart of a method of 3D printing a labeled object, according to some embodiments of the invention.

Figure 1:
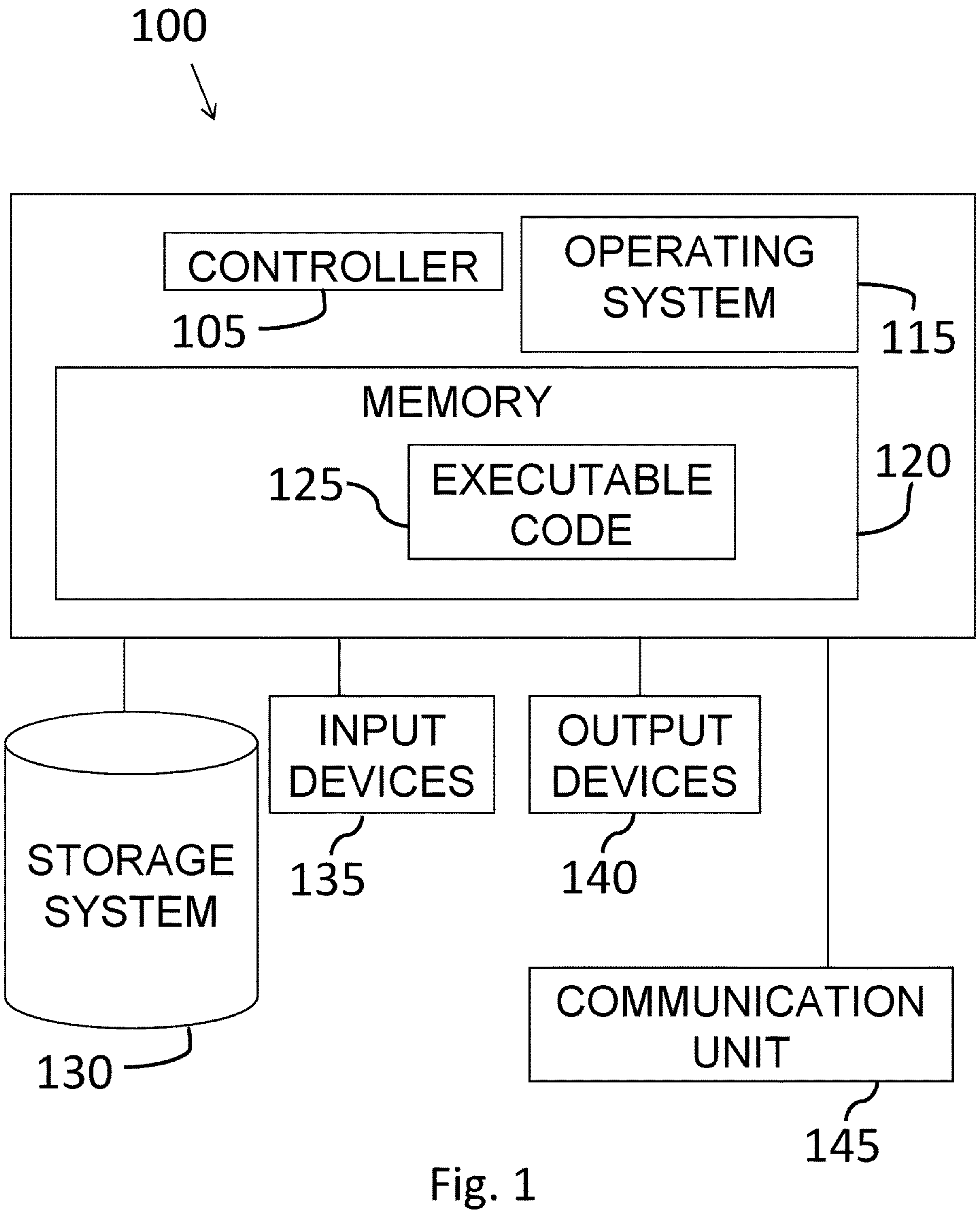
FIG. 1 shows a block diagram of a computing device, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention.

Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items.

Unless explicitly stated, the method embodiments described herein are not constrained to a particular order or sequence. Additionally, some of the described method embodiments or elements thereof may occur or be performed simultaneously, at the same point in time, or concurrently.

Reference is made to FIG. 1, which is a block diagram of an example computing device, according to some embodiments of the invention.

Computing device 100 may include a controller or processor 105 (e.g., a central processing unit processor (CPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet.

Controller 105 may be configured to execute program code to perform operations described herein. The system described herein may include one or more computing device (s) 100, for example, to act as the various devices or the components shown in FIG. 3A. For example, controller 105 may be configured to communicate with a printing device that is connected to the controller 105.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units.

Memory 120 may be or may include a plurality of similar and/or different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein.

Although, for the sake of clarity, a single item of executable code 125 is shown in FIG. 1, a system according to embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices.

Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

For example, an article may include a storage medium such as memory 120, computer-executable instructions such as executable code 125 and a controller such as controller 105. Such a non-transitory computer readable medium may be for example a memory, a disk drive, or a USB flash memory, encoding, including or storing instructions, e.g., computer-executable instructions, which when executed by a processor or controller, carry out methods disclosed herein.

The storage medium may include, but is not limited to, any type of disk including, semiconductor devices such as read-only memories (ROMs) and/or random-access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to embodiments of the invention may include components such as, but not limited to, a plurality of central processing units (CPUs), a plurality of graphics processing units (GPUs), or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components.

In some embodiments, a system may include or may be, for example, a personal computer, a desktop computer, a laptop computer, a workstation, a server computer, a network device, or any other suitable computing device.

For example, a system as described herein may include one or more facility computing device 100 and one or more remote server computers in active communication with one or more facility computing device 100 such as computing device 100, and in active communication with one or more portable or mobile devices such as smartphones, tablets and the like.

Figure 2:
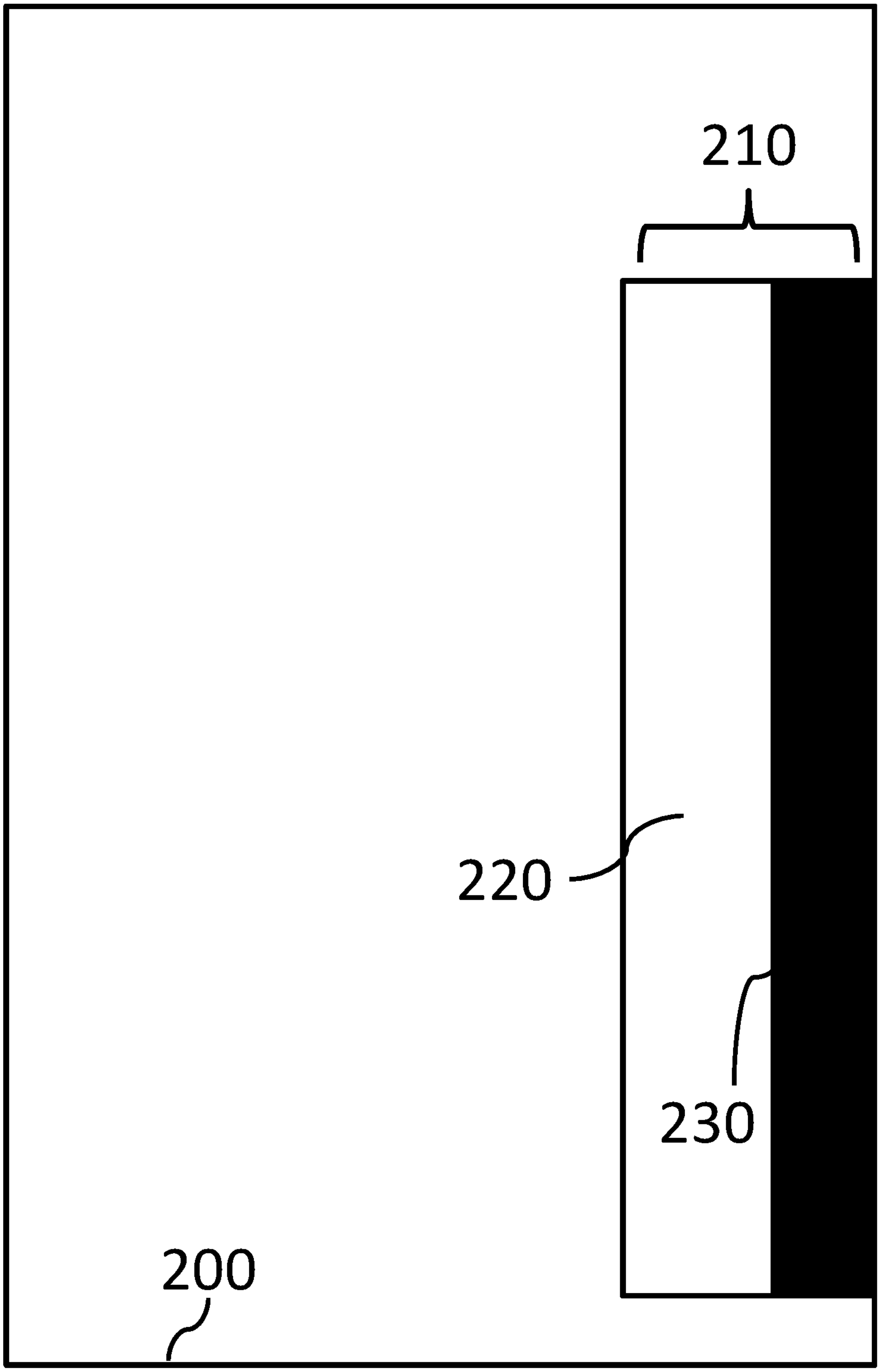
FIG. 2 illustrates a cross-sectional view of a labeled model of a 3D object, according to some embodiments of the invention.

Reference is now made to FIG. 2, which illustrates a cross-sectional view of a labeled model of a 3D object, according to some embodiments of the invention.

The label may be a 2D image with RGBa (Red, Green, Blue, alpha) values per pixel. In order to apply label 210 onto container 200, a portion of container 200 at the size of label 210 may be removed. The removed section of container 200 may accordingly be replaced by label 210, such that the original size of the 3D model is preserved.

In some embodiments, when label 210 is colored, a white background 220 is generated inward from the surface of container 200, and a colored portion 230 is generated on top of white background 220.

In contrast to flat or 2D structures, when printing a 3D object with a label, it may be required to consider the depth of the colored pixels in the label such that after printing the color of the label is compatible with the colors of the 3D object to which the label is added.

In some embodiments, label 210 may be textured such that the printed container 200 has a different or varying size, texture and/or shape. For example, label 210 may protrude outwards from container 200 surface.

In some embodiments, label 210 and/or container 200 may be at least partially transparent.

Figure 3A:
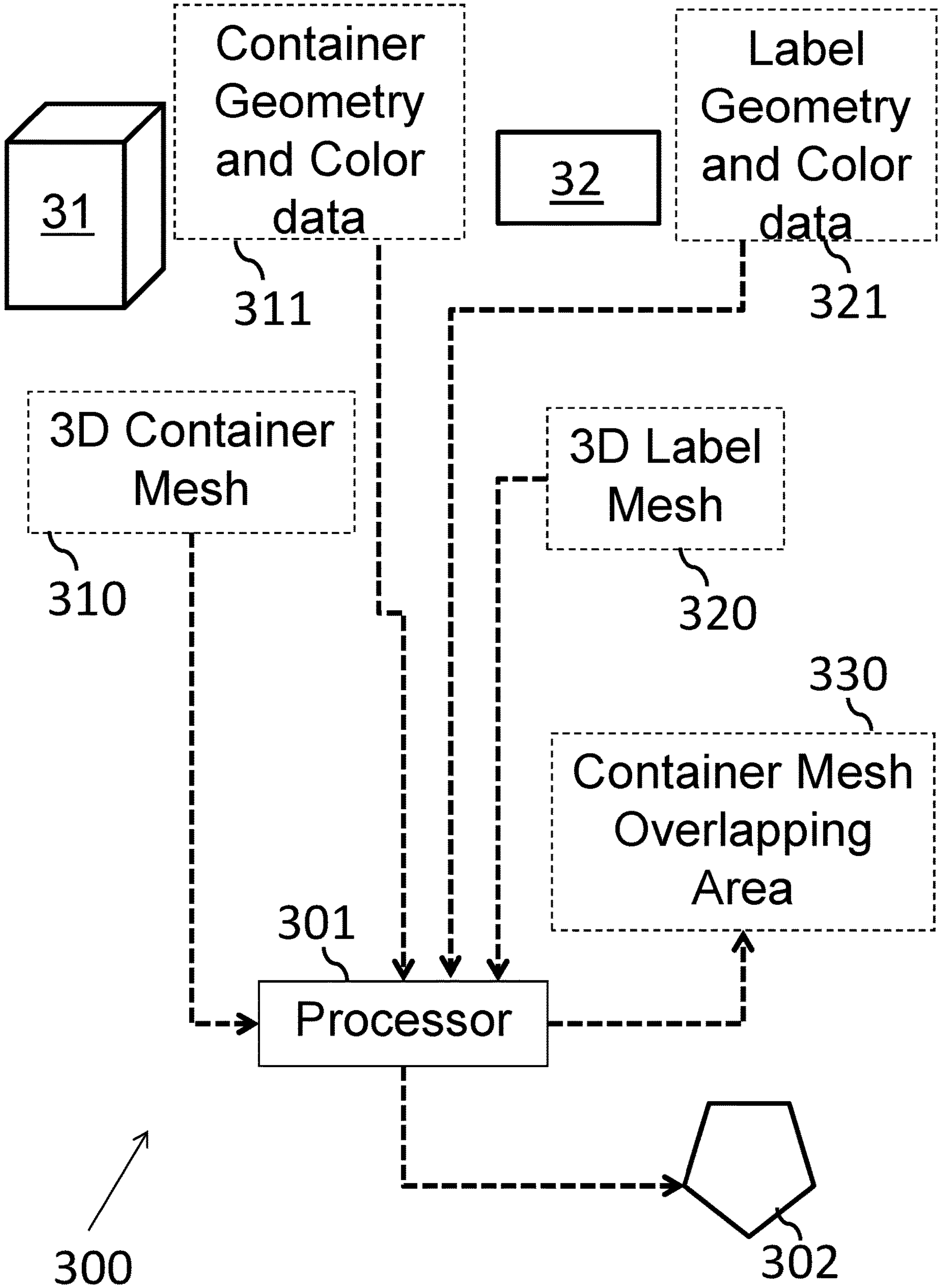
FIGS. 3A-3B show a block diagram of a system for printing a labeled 3D object, according to some embodiments of the invention.
Figure 3B:
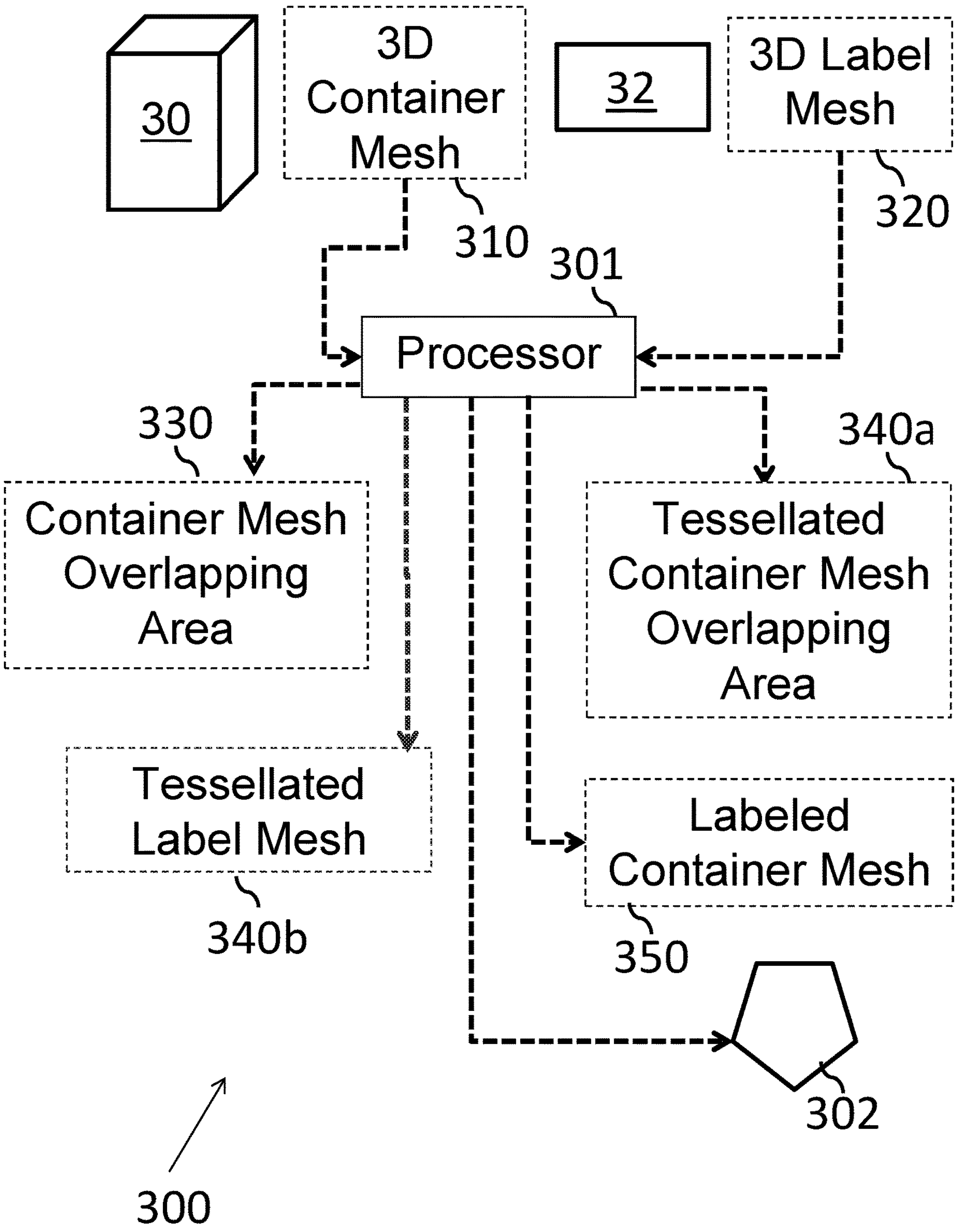

Reference is now made to FIG. 3A, which shows a block diagram of a system 300 for printing a labeled 3D object, according to some embodiments of the invention. In FIGS. 3A and 3B, hardware elements are indicated with a solid line and the direction of arrows indicate a direction of information flow between the hardware elements.

For printing a 3D object 31, dedicated information may be retrieved for a 3D container mesh 310 of 3D object 31. For example, the information retrieved for the 3D container mesh 310 may include container geometry and color data 311 of the 3D object 31.

In some embodiments, container geometry and color data 311 includes a plurality of vertices, edges and/or faces, and a texture map and/or colors per vertex.

Similarly, for printing a label 32, corresponding information may be retrieved for a 3D label mesh 320 of label 32. For example, the information retrieved for 3D label mesh 320 may include label geometry and color data 321.

In some embodiments, label geometry and color data 321 includes a color value assigned to each vertex of the 3D label mesh 320, and/or to a texture map. In some embodiments, label geometry and color data 322 include transparency data as additional values to the color.

In some embodiments, 3D label mesh 320 may be an open mesh (i.e. not watertight).

In some embodiments, label geometry and color data 321 includes a plurality of vertices, edges and/or faces, and a texture map and/or colors per vertex.

In some embodiments, system 300 may include a processor 301 (e.g., similarly to controller 105 shown in FIG. 1). The processor 301 may receive 3D container mesh 310 with container geometry and color data 311 of the 3D object 31, and 3D label mesh 320 with label geometry and color data 321, for printing with a 3D printing device 302.

For example, processor 301 may receive 3D container mesh 310 and/or 3D label mesh 320 as a dedicated file for 3D printing.

In some embodiments, 3D container mesh 310 is a watertight mesh. In order to maintain the watertight feature after printing the 3D object 31 with the label 32, it may be required to stitch open edges of label 32 to create a watertight volume.

According to some embodiments, processor 301 determines and ensures correct positioning of 3D label mesh 320 in relation to 3D container mesh 310. In some embodiments, ensuring correct positioning of 3D label mesh 320 in relation to 3D container mesh 310 includes verifying that a normal distance from each vertex of 3D label mesh 320 to the surface of the 3D container mesh 310 does not exceed a predetermined threshold or tolerance.

According to some embodiments, processor 301 may project the contour of 3D label mesh 320 onto 3D container mesh 310 to obtain a container mesh overlapping area 330.

Projecting the contour of 3D label mesh 320 onto 3D container mesh 310 may include projecting open edges of 3D label mesh 320 onto 3D container mesh 310.

In some embodiments, projecting open edges of 3D label mesh 320 onto 3D container mesh 310 is performed by projecting straight lines using a geodesic path.

Reference is now made to FIG. 3B, which shows a block diagram of system 300 with additional elements, according to some embodiments of the invention.

According to some embodiments, processor 301 may apply a local tessellation (or tiling) to container mesh overlapping area 330 to generate a tessellated container mesh overlapping area 340*a*.

Thus, tessellated container mesh overlapping area 340*a* may match the contour of the 3D label mesh 320.

In some embodiments, the tessellation may include checking for label's open edge that crosses the container edge by minimal skew lines distance. At the intersection point, the container triangle and its neighbor triangle(s) may be tessellated, where the label's open edge may be broken into at least two segments.

The local tessellation that is applied to container mesh overlapping area 330 may include adding vertices and faces to 3D container mesh 310 so that for each vertex of the 3D label mesh 320 open edges corresponds a projected vertex on container mesh overlapping area 330.

According to some embodiments, processor 301 may apply a local tessellation (or tiling) to label mesh 320 to generate a tessellated label mesh 340*b*.

The local tessellation that is applied to label mesh 320 may include adding vertices and faces to label mesh 320 so that for each vertex of container mesh overlapping area 330 corresponds a projected vertex on label mesh 320.

In some embodiments, processor 301 may replace tessellated container mesh overlapping area 340*a* with tessellated 3D label mesh 340*b* thereby obtaining a labeled container mesh 350. Replacement of the tessellated container mesh overlapping area 340*a* with tessellated 3D label mesh 340*b* may include cutting out tessellated container mesh overlapping area 340*a* from 3D container mesh 310 and inserting tessellated 3D label mesh 340*b* at the same location.

In some embodiments, processor 301 may issue a command to printing device 302 to print the labeled 3D object on 3D printing device 302 based on the labeled container mesh.

For example, printing the labeled 3D object based on labeled container mesh 350 may include slicing the labeled container mesh in a plurality of slices, each slice including a plurality of voxels.

In some embodiments, a material allocation to a voxel associated with the label of the labeled container mesh is determined according to (i) a distance of the voxel from the closest surface of the label and (ii) a color data associated with said label closest surface and encoded with a red, green, blue and alpha (RGBa) vector.

The distance of the voxel from the closest surface of label 32 may be such that the voxel is located in the label color area. In some embodiments, the distance of the voxel from the closest surface of label 32 may be such that the voxel is located in the label core area.

Figure 4:
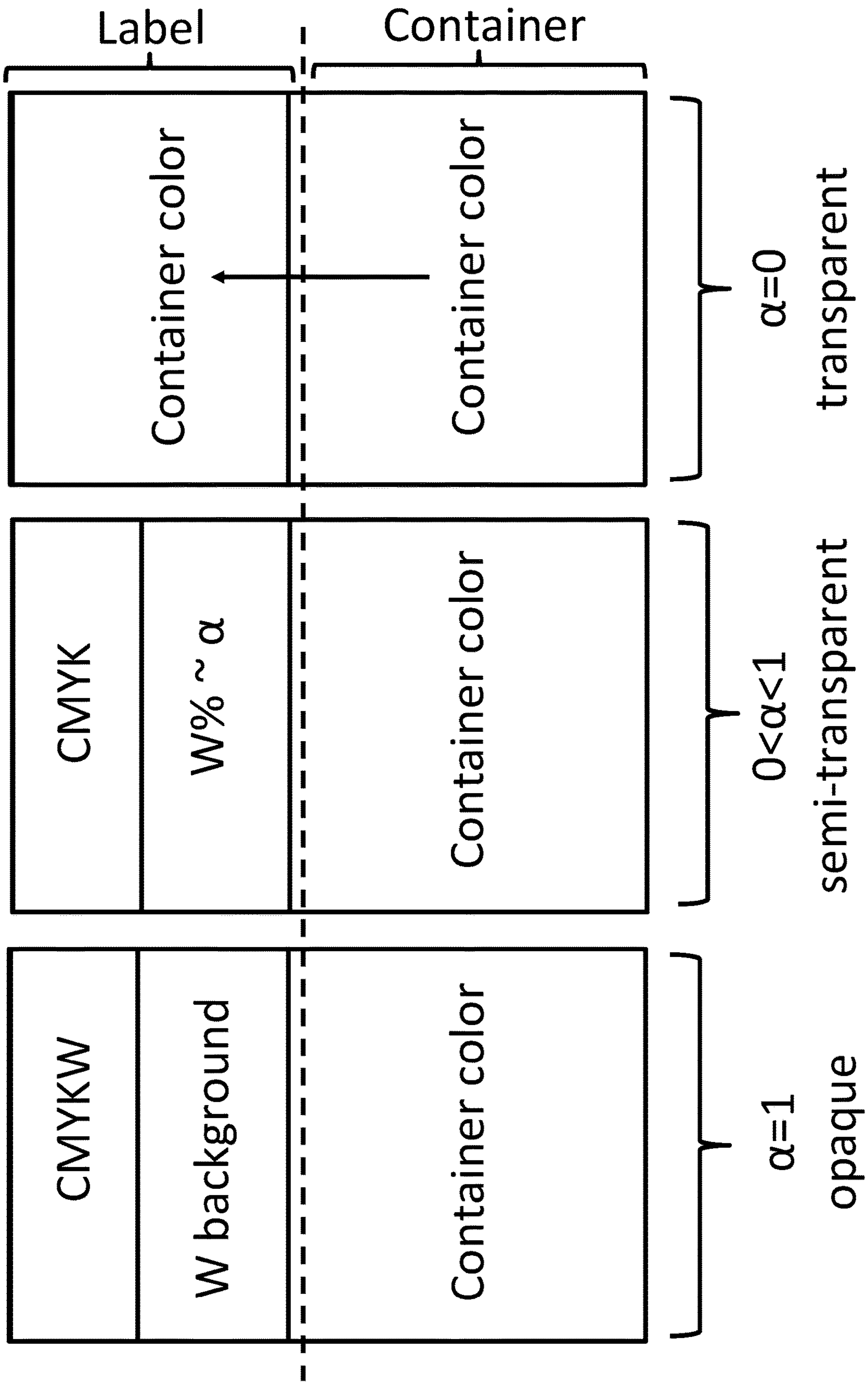
FIG. 4 shows cross-sectional schematical views of a portion of a labeled 3D object with various transparency levels of the label, according to some embodiments of the invention.

Reference is now made to FIG. 4, which shows cross-sectional schematical views of a portion of a labeled 3D object with various transparency levels of the label, according to some embodiments of the invention. For example, the thickness of the label may include a 1 millimeter W core (or background) and a color coating of 0.5 millimeters.

In some embodiments, the color data associated with the label closest surface includes an alpha value of 'l' and wherein the material allocated to the voxel is selected from cyan, magenta, yellow, black and white (CMYKW) according to an opaque International Color Consortium (ICC) profile. The color data associated with the label closest surface may include an alpha value of $0<a<1$ and wherein the material allocated to the voxel is selected from cyan, magenta, yellow, black and white (CMYKW) according to a clear ICC profile.

In some embodiments, the color data associated with the label closest surface may include an alpha value of 0 and wherein the material allocated to the voxel is selected from cyan, magenta, yellow, black, white and clear (CMYKWT) according to the container color assignment rule.

In some embodiments, the color data associated with the label closest surface may include an alpha value of 1 and wherein the material allocated to the voxel is white (W). The chance that white (W) material is allocated to the voxel may be directly proportional to the alpha value.

The color data associated with the label closest surface may include an alpha value of $0<a<1$ and wherein the material allocated to the voxel is selected from cyan, magenta, yellow, black, white and clear (CMYKWT) depending on the alpha value and on the container color assignment rule.

In some embodiments, the color data associated with the label closest surface may include an alpha value of '0' and wherein the material allocated to the voxel is selected from cyan, magenta, yellow, black, white and clear (CMYKWT) according to a container color assignment rule.

Figure 5B:
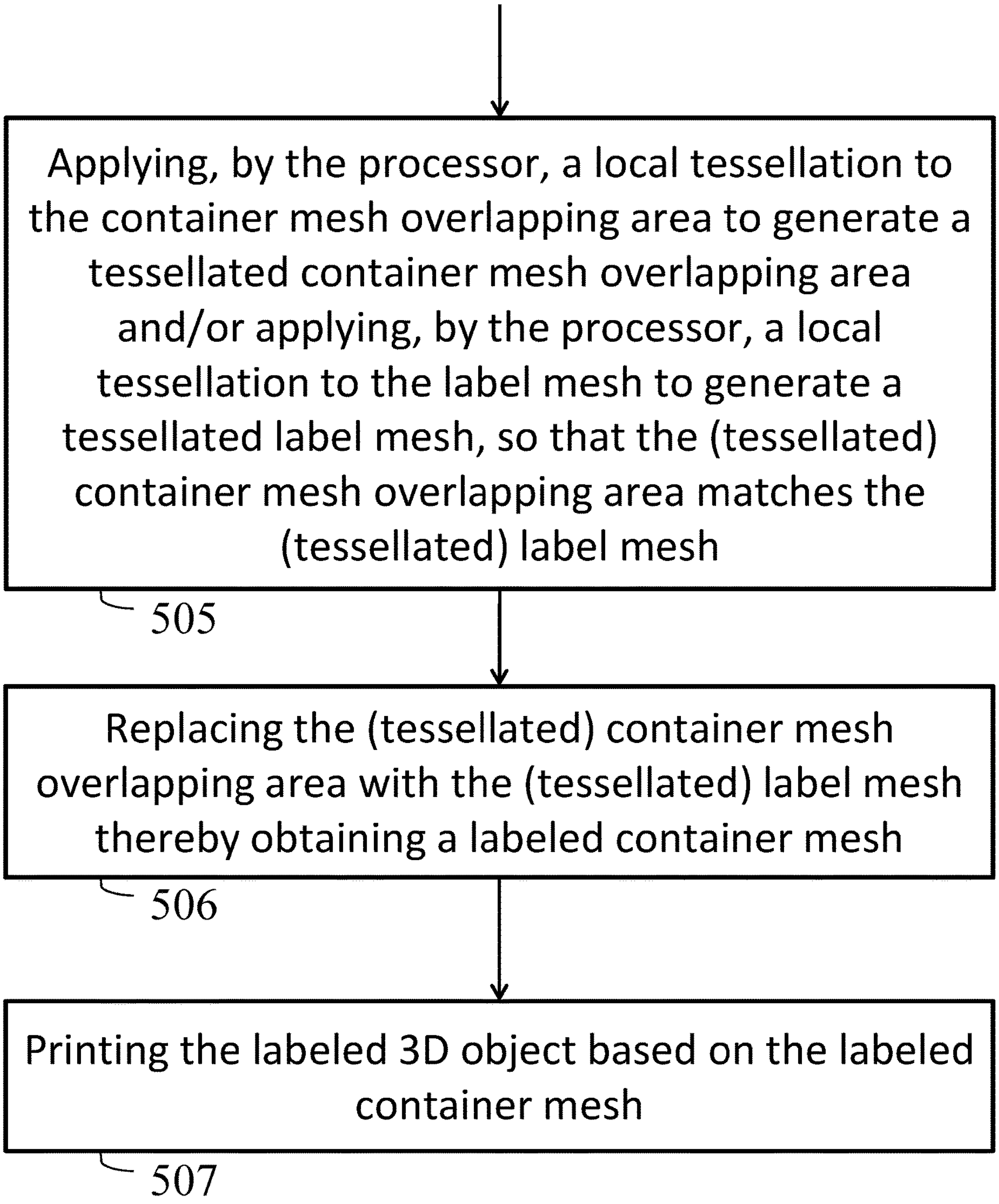

Reference is now made to FIGS. 5A-5B, which show a flowchart of a method of 3D printing a labeled object, according to some embodiments of the invention.

In Step 501, a 3D container mesh may be received (e.g., by the processor), the 3D container mesh including data corresponding to the geometry and color of the object, wherein the 3D container mesh is a watertight mesh.

In Step 502, a 3D label mesh may be received (e.g., by the processor), the 3D label mesh including data corresponding to the geometry and color of a label, wherein the 3D label mesh is an open mesh.

In Step 503, correct positioning of the 3D label mesh may be ensured (e.g., by the processor), with regard to the 3D container mesh.

In Step 504, the contour of the 3D label mesh may be projected (e.g., by the processor), on the 3D container mesh to obtain a container mesh overlapping area.

In Step 505, a local tessellation may be applied (e.g., by the processor), to the the 3D container mesh overlapping area to generate a tessellated container mesh overlapping area and/or a local tessellation may be applied (e.g., by the processor), to the 3D label mesh to generate a tessellated label mesh; so that the (tessellated) container mesh overlapping area matches the (tessellated) label mesh.

In Step 506, the (tessellated) container mesh overlapping area may be replaced (e.g., by the processor), with the (tessellated) label mesh thereby obtaining a labeled container mesh.

In Step 507, the labeled 3D object may be printed (e.g., on the 3D printing device) based on the labeled container mesh.

While certain features of the invention have been illustrated and described herein, many modifications, substitutions, changes, and equivalents may occur to those skilled in the art. It is, therefore, to be understood that the appended claims are intended to cover all such modifications and changes.

Various embodiments have been presented. Each of these embodiments may of course include features from other embodiments presented, and embodiments not specifically described may include various features described herein.

The invention claimed is:

1. A method of 3D printing a labeled object, the method comprising:

- receiving a 3D container mesh comprising data corresponding to the geometry and color of the object, wherein the 3D container mesh is a watertight mesh:
- receiving a 3D label mesh comprising data corresponding to the geometry and color of a label, wherein the 3D label mesh is an open mesh:
- ensuring correct positioning of the label mesh in relation to the container mesh:
- projecting the contour of the label mesh onto the container mesh to obtain a container mesh overlapping area:
- applying a local tessellation to the container mesh overlapping area according to the label contour, thereby generating a tessellated container mesh and/or applying a local tessellation to the label mesh according to the container mesh overlapping area, thereby generating a tessellated label mesh;
- replacing the tessellated container mesh overlapping area with the tessellated label mesh, thereby obtaining a labeled container mesh; and
- printing the labeled 3D object based on the labeled container mesh.

2. The method of claim 1, wherein the geometric data of the container mesh comprises a plurality of vertices and faces, and wherein the color data comprises a texture map and/or colors per vertex.

3. The method of claim 1, wherein the geometric data of the label mesh comprises a plurality of vertices and faces, and wherein the color data comprises a texture map and/or colors per vertex.

4. The method of claim 1, wherein ensuring correct positioning of the label mesh in relation to the container mesh comprises verifying that a normal distance from each vertex of the label mesh to the surface of the container mesh does not exceed a predetermined threshold.

5. The method of claim 1, wherein projecting the contour of the label mesh on the container mesh comprises projecting open edges of the label mesh onto the container mesh.

6. The method of claim 5, wherein projecting open edges of the label mesh onto the container mesh is performed by projecting straight lines using a geodesic path.

7. The method of claim 1, wherein applying a local tessellation to the container mesh overlapping area comprises adding, moving or deleting vertices and faces of the container mesh so that for each vertex of the label mesh open edges corresponds a projected vertex on the container mesh overlapping area.

8. The method of claim 1, wherein applying a local tessellation to the label mesh comprises adding, moving or deleting vertices and faces of the label mesh so that for each vertex of the container mesh overlapping area corresponds a projected vertex on the label mesh.

9. The method of claim 1, wherein replacing the tessellated container mesh overlapping area with the tessellated label mesh comprises cutting out the tessellated container mesh overlapping area from the container mesh and inserting the tessellated label mesh at the same location.

10. The method of claim 1, wherein printing the labeled 3D object based on the labeled container mesh comprises slicing the labeled container mesh in a plurality of slices, each slice comprising a plurality of voxels.

11. The method of claim 10, wherein a material allocation to a voxel associated with the label of the labeled container mesh is determined according to (i) a distance of the voxel from the closest surface of the label and (ii) a color data associated with said label closest surface and encoded with a red, green, blue and alpha (RGBa) vector.

12. The method of claim 11, wherein the distance of the voxel from the closest surface of the label is such that the voxel is located in the label color area.

13. The method of claim 12, wherein the color data associated with said label closest surface comprises an alpha value of 1 and wherein the material allocated to the voxel is selected from cyan, magenta, yellow, black and white (CMYKW) according to an opaque ICC profile.

14. The method of claim 12, wherein the color data associated with said label closest surface comprises an alpha value of $0<a<1$ and wherein the material allocated to the voxel is selected from cyan, magenta, yellow, black and white (CMYKW) according to a clear ICC profile.

15. The method of claim 12, wherein the color data associated with said label closest surface comprises an alpha value of 0 and wherein the material allocated to the voxel is selected from cyan, magenta, yellow, black, white and clear (CMYKWT) according to the container color assignment rule.

16. The method of claim 11, wherein the distance of the voxel from the closest surface of the label is such that the voxel is located in the label core area.

17. The method of claim 16, wherein the color data associated with said label closest surface comprises an alpha value of 1 and wherein the material allocated to the voxel is white (W).

18. The method of claim 16, wherein the color data associated with said label closest surface comprises an alpha value of $0<a<1$ and wherein the material allocated to the voxel is selected from cyan, magenta, yellow, black, white and clear (CMYKWT) depending on the alpha value and on the container color assignment rule.

19. The method of claim 18, wherein the chance that white (W) material is allocated to the voxel is directly proportional to the alpha value.

20. The method of claim 16, wherein the color data associated with said label closest surface comprises an alpha value of 0 and wherein the material allocated to the voxel is selected from cyan, magenta, yellow, black, white and clear (CMYKWT) according to a container color assignment rule.

* * * * *